(12) United States Patent
Ishii (10) Patent No.: US 8,442,071 B2
(45) Date of Patent: May 14, 2013

(54) RELAY DEVICE AND WIRELESS CONTROL NETWORK MANAGEMENT SYSTEM USING THE SAME

(75) Inventor: Yousuke Ishii, Tokyo (JP)

(73) Assignee: Yokogawa Electric Corporation, Musashino-shi, Tokyo (JP)

( * ) Notice: Subject to any disclaimer, the term of this patent is extended or adjusted under 35 U.S.C. 154(b) by 251 days.

(21) Appl. No.: 12/943,614

(22) Filed: Nov. 10, 2010

(65) Prior Publication Data

US 2011/0110291 A1 May 12, 2011

(30) Foreign Application Priority Data

Nov. 10, 2009 (JP) ................................ 2009-256945

(51) Int. Cl.
*H04J 3/22* (2006.01)
(52) U.S. Cl.
USPC ........ 370/473; 370/235; 370/395.4; 370/411; 370/442
(58) Field of Classification Search .................. 370/328, 370/315, 235, 395.4, 411, 442, 473
See application file for complete search history.

(56) References Cited

U.S. PATENT DOCUMENTS

| | | | |
|---|---|---|---|
| 7,725,599 B2 * | 5/2010 | Van Datta | 709/243 |
| 7,747,775 B2 * | 6/2010 | Van Datta | 709/238 |
| 7,936,709 B2 * | 5/2011 | Bhatti et al. | 370/326 |
| 2006/0269066 A1 * | 11/2006 | Whitehead et al. | 380/270 |
| 2007/0153815 A1 * | 7/2007 | She et al. | 370/401 |
| 2007/0268884 A1 | 11/2007 | Kolavennu et al. | |
| 2009/0316628 A1 * | 12/2009 | Enns et al. | 370/328 |

OTHER PUBLICATIONS

Control with WirelessHART Tech Notes, HART Communication Foundation, Mar. 5, 2010.
Wireless systems for industrial automation: Process Control and Related Applications, ISA-100.11a-2009.

* cited by examiner

*Primary Examiner* — Ricky Ngo
*Assistant Examiner* — DeWanda Samuel
(74) *Attorney, Agent, or Firm* — Westerman, Hattori, Daniels & Adrian, LLP (57) ABSTRACT

There is provided a relay device for relaying first wireless communication and second wireless communication. The first wireless communication is based on a process control wireless communication standard, and the second wireless communication is based on another wireless communication standard than the process control wireless communication standard. The device includes: a superframe management unit configured to receive a first superframe of the first wireless communication from the outside and generate a second superframe of the second wireless communication based on the first superframe; and a transmission unit configured to transmit the second superframe to a wireless communication terminal performing the second wireless communication.

9 Claims, 7 Drawing Sheets

RELAY DEVICE AND WIRELESS CONTROL NETWORK MANAGEMENT SYSTEM USING THE SAME

This application claims priority from Japanese Patent Application No. 2009-256945, filed on Nov. 10, 2009, the entire contents of which are herein incorporated by reference.

BACKGROUND

1. Technical Field

The present disclosure relates to a relay device and a wireless control network management system using the same.

2. Related Art

A technique in which, for example, a process control system in industrial automation is formed as a wireless control network system using wireless communication has been heretofore proposed. This aims at eliminating a disadvantage of lowering of control accuracy in a background-art control system which was formed as a wireline network system, so that a field device such as a sensor for measuring temperature, flow rate, etc. could not be set in an optimal position in a plant because of a communication distance limit, a hardwiring limit, etc. On the other hand, a wireless control network management system for controlling operation of the wireless control network system to optimize operation of the whole plant has been proposed.

Incidentally, various kinds of field devices such as a differential pressure gage, a flowmeter, a thermometer, a surveillance camera, an actuator, a controller, etc. are used as examples of the field device.

There has been recently a trend to incorporate a wireless technique in various industrial fields inclusive of a process control field, and wireless communication standards have been discussed in conjunction with the trend. Specifically, WirelessHART defined in HART (Highway Addressable Remote Transducer) 7 and a process control wireless communication standard ISA100.11a approved by the ISA100 committee in the International Society of Automation (ISA) have been discussed. WirelessHART and ISA100.11a are protocols/standards for industrial wireless communication using frequency division communication. For example, the contents of rules concerned with the respective communications have been described in the following documents.

Document 1: Wireless systems for industrial automation: Process control and related applications Document 2: Control with WirelessHART
(URL:http://www.hartcomm.org/protocol/training/resources/wiHART_resources/Control_with_WirelessHART.pdf)

WirelessHART and ISA100.11a are used in a wireless control network system in which a great deal of field devices are set while size reduction and power saving characteristic of IEEE (Institute of Electrical and Electronic Engineers) 802.15.4 is utilized.

On the other hand, a wireless communication system using "Wi-Fi (Wireless Fidelity) technique (hereinafter referred to as Wi-Fi wireless communication)" according to IEEE 802.11a/IEEE 802.11b has been heretofore proposed.

With respect to the Wi-Fi communication, a wireless communication system in which field devices such as a maintenance terminal for field worker's maintenance work, a surveillance camera requiring communication of a great deal of data (e.g. statistical data and various kinds of image data such as motion image data and still image data), etc. are connected has been proposed in a process control system.

A relay device for relaying wireless communication according to WirelessHART and ISA100.11a and wireless communication according to Wi-Fi communication in order to control operation of a wireless control network system by using both the communications to optimize operation of a plant as a whole, and a wireless control network system using the relay device have been heretofore discussed.

In other words, a relay device for achieving a mechanism of coexistence of a wireless system according to WirelessHART and ISA100.11a using frequency hopping and a Wi-Fi system, and a wireless control network system using the relay device have been discussed.

For example, U.S. Patent Application Pub. No. 2007/026884 describes a relay device and a wireless control network system using the relay device in a related-art.

A technique concerned with a mechanism of coexistence of a wireless system using frequency hopping and a Wi-Fi wireless communication system has been described in US2007/026884. The technique is characterized in that communication frames having guard intervals (blank times for preventing interference) provided by dividing communication time zones of both wireless systems are used.

(Problem 1)

In the above-mentioned relay device and the wireless control network system in the related art, however, because the communication time zone in each communication system is divided, the time zone in which a wireless communication band can be used is limited in accordance with each communication system (each of the wireless system according to ISA100.11a etc. using frequency hopping and the Wi-Fi wireless communication system). There is a problem that throughput in each wireless system is lowered.

Moreover, in the above-mentioned relay device and the wireless control network system in the related art, because the communication time zone in each communication system is divided, the communication time allocated to each wireless system (each of the wireless system according to ISA100.11a etc. using frequency hopping and the Wi-Fi wireless communication system) is reduced compared with the case where only one wireless system is operated singly. Accordingly, there is a problem that the number of nodes accommodated per unit time is reduced in proportion to reduction in the communication time allocated to each wireless system.

Specifically, as a typical application in industrial wiring communication, there is an application which collects data of a large number of wireless devices periodically through an access point (hereinafter referred to as AP) which is an example of the relay device. The bottleneck of the number of accommodated nodes in this case is the AP. Particularly the number of communications per period allowed to be performed by the AP is directly connected with the number of nodes accommodated in the network.

For this reason, in accordance with the related art, the communication time zone in each communication system is divided. Accordingly, the communication time allocated to each wireless system is reduced compared with the case where only one wireless system is operated singly. There is a problem that the number of accommodated nodes per unit time is reduced in proportion to reduction in the communication time allocated to each wireless system.

(Problem 2)

On the other hand, it is conceivable that the mechanism of coexistence of the wireless system according to WirelessHART and ISA100.11a using frequency hopping and the Wi-Fi system is achieved in such a manner that channels allowed to be used in both the wireless systems are allocated stationarily.

Figure 7:
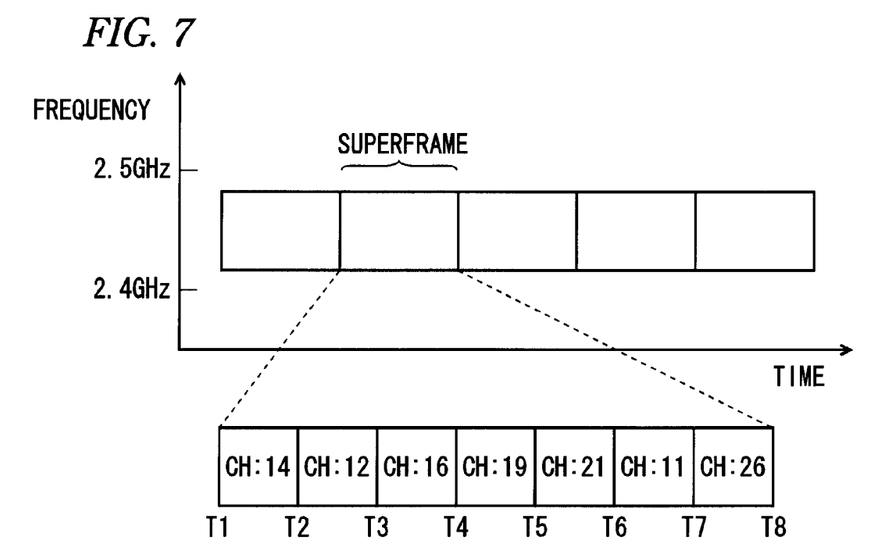
FIG. 7 is an explanatory view showing a superframe used in wireless communication according to WirelessHART and ISA100.11a using frequency hopping.

However, if channels which can be used in the two wireless systems are allocated stationarily for coexistence though frequency division communication of ISA100.11a aims at reducing a risk of wireless communication fault such as noise interference by distributive hopping of channels to be used, mixing of Wi-Fi communication reduces channels which can be used for frequency hopping as will be clear from FIG. 7. Accordingly, there is a problem that not only the benefit of channel distribution according to ISA100.11a decreases but also the risk of deterioration of wireless communication quality due to noise interference increases.

Moreover, if a plurality of Wi-Fi networks coexist when usable channels are allocated stationarily to wireless systems according to respective wireless communication standards to attain coexistence, the number of channels allowed to be used in ISA100.11a is limited to a very small number. Accordingly, there is a problem that the advantage of the communication mechanism of ISA100.11a intended for high reliability in field environment is spoiled greatly.

An example of the related art in the case where usable channels are allocated stationarily to two wireless systems to make the two wireless systems coexistent and the problem inherent in the example of the background art will be described specifically with reference to the drawings.

Figure 5:
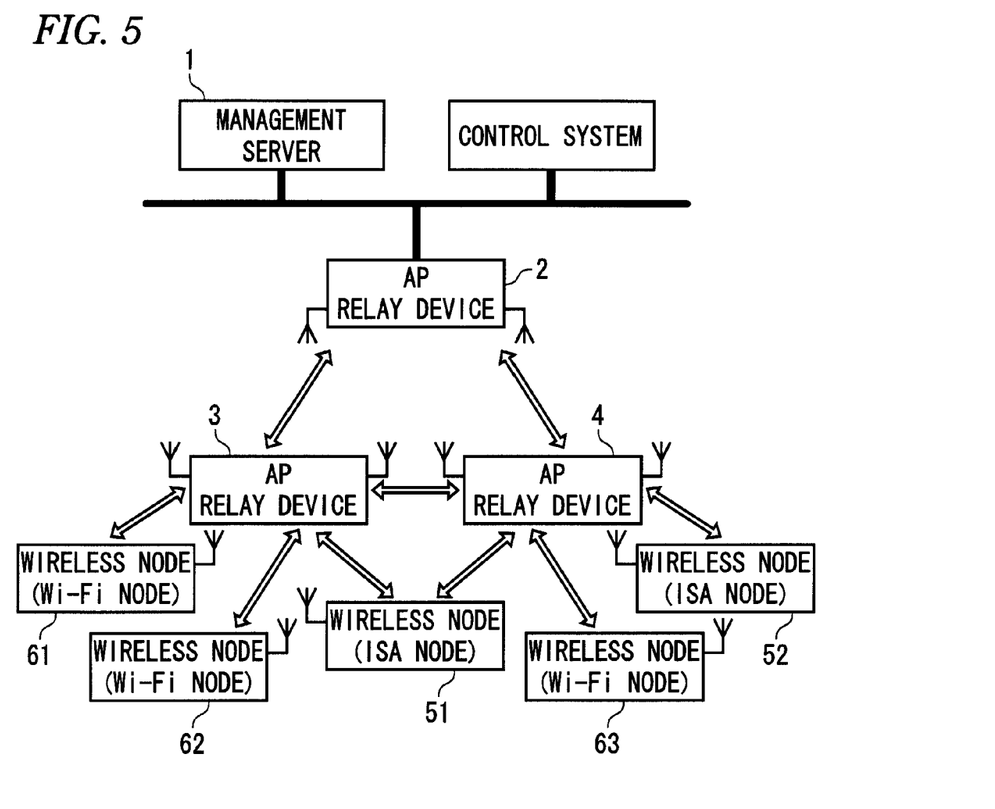
FIG. 5 is a diagram for explaining a problem in a relay device and a wireless control network management system using the relay device in a related art.

FIG. 5 is a diagram for explaining the problem in a relay device and a wireless control network management system using the relay device in the related art. In FIG. 5, the related-art wireless control network management system includes a management server 1 which aggregates information of a wireless network from wireless nodes 51-52 and collects and stores data from the wireless nodes 51-52 to thereby control the whole of a wireless system, for example, according to WirelessHART and ISA100.11a using frequency hopping; AP's 2-4 as examples of relay devices which communicate with respective wireless nodes 51-52 and 61-63 and relay wireless communication; wireless nodes 51-52 (represented by ISA nodes in FIG. 5) which are field devices, for example, having sensor functions for measuring physical quantities such as temperature, flow rate, etc. or actuator functions for controlling control valves and which have wireless communication functions for wirelessly transmitting various kinds of measured data by wireless communication according to WirelessHART and ISA100.11a using frequency hopping; and wireless nodes 61-63 (represented by Wi-Fi nodes in FIG. 5) which are field devices such as a maintenance terminal for field worker's maintenance work, a surveillance camera requiring communication with a great deal of data (e.g. statistical data and various kinds of image data such as motion image data and still image data) and which have wireless communication functions for wirelessly transmitting various kinds of measured data by wireless communication according to Wi-Fi.

Here, the wireless nodes 51 and 52 perform wireless communication according to ISA100.11a and use IEEE802.15.4 with a 2.4 GHz band as a communication frequency band.

The wireless nodes 61-63 perform wireless communication according to Wi-Fi wireless communication. When IEEE802.11b/g is used as a communication frequency, the same 2.4 GHz band as that of ISA100.11a is used as a use frequency band. That is, the frequency band for wireless communication according to Wi-Fi and the frequency band for wireless communication according to ISA100.11a/WirelessHART compete with each other.

For this reason, the frequency band for wireless communication of the wireless nodes 51-52 and the frequency band for wireless communication of the wireless nodes 61-63 compete with each other because the same 2.4 GHz band is used.

Figure 6A:
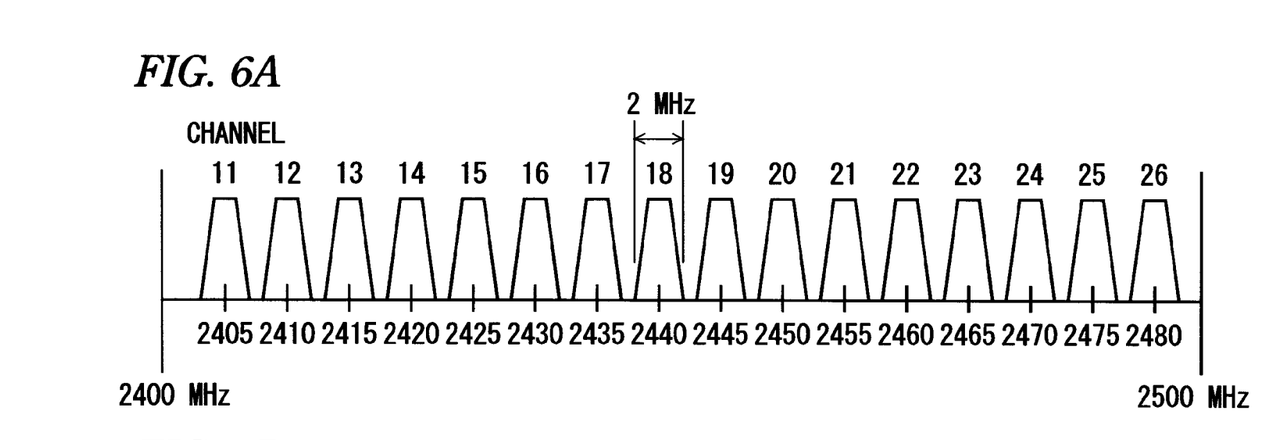
FIGS. 6A and 6B are explanatory views showing a state of use of frequency bands when a wireless system using frequency hopping and a Wi-Fi system coexist as shown in FIG. 5.
Figure 6B:
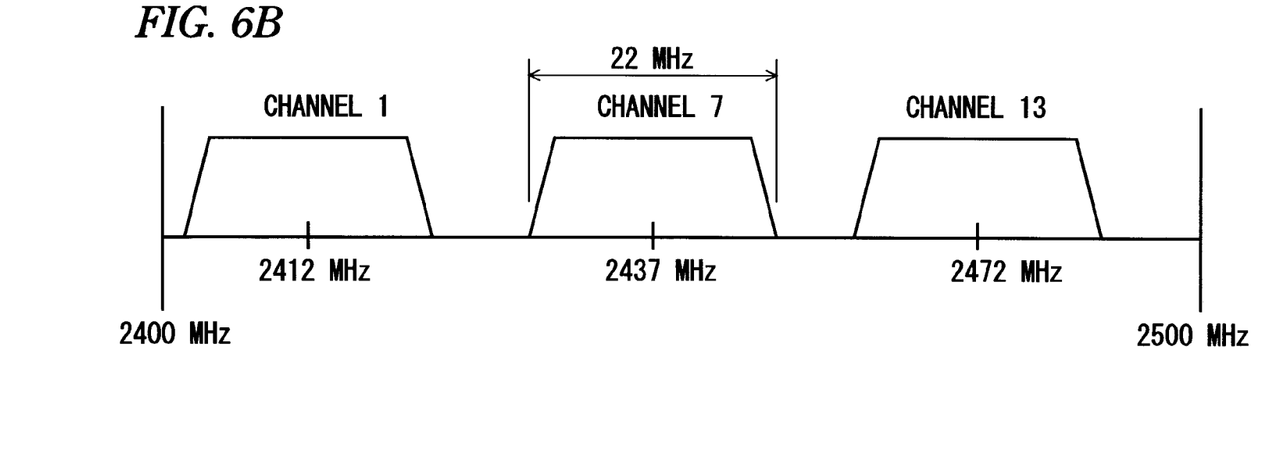

FIGS. 6A and 6B are explanatory views showing a state of use of frequency bands when a wireless system using frequency hopping in FIG. 5 and a Wi-Fi system coexist. FIG. 6A is a view for explaining the frequency band of ISA100.11a wireless communication. FIG. 6B is a view for explaining the frequency band of Wi-Fi wireless communication.

FIGS. 6A and 6B show frequency bands used in respective wireless nodes. For example, the wireless nodes 51 and 52 perform wireless communication according to ISA100.11a ad use IEEE802.15.4 with a 2.4 GHz band as a communication frequency band. As shown in FIG. 6A, the communication channel is divided into sixteen communication channels (ID: 11 to 26).

The wireless nodes 61-63 perform wireless communication according to Wi-Fi. Particularly when IEEE802.11b/g is used, the wireless nodes 61-63 use the same 2.4 GHz band as that of ISA100.11a as a use frequency band. As shown in FIG. 6B, the communication channel is divided into three communication channels (ID: 1, 7 and 13).

Specifically, communication channels 11-14, 16-20 and 21-25 in the wireless nodes 51 and 52 compete with communication channels 1, 7 and 13 in the wireless nodes 61-63.

Meanwhile, wireless communication according to ISA100.11a/WirelessHART in the wireless nodes 51-52 is characterized in that communication is performed with time division multiple access (TDMA) and frequency division multiple access (FDMA) being combined with each other. The wireless communication is performed while a superframe which will be described later is used for defining frequencies and timings of communication between wireless nodes.

The management server 1 divides the time zone and frequency band of wireless communication performed by the wireless nodes 51-52, defines timings of communication between the wireless nodes and a frequency/frequency band in accordance with each communication timing, generates a superframe and distributes the superframe to the wireless nodes 51-52.

Incidentally, the term "superframe" means a communication template in which the timing of communication between wireless nodes and the frequency/frequency band for each communication timing are defined by dividing the time zone and the frequency band of wireless communication performed by the wireless nodes.

FIG. 7 is an explanatory view showing a superframe used in wireless communication according to WirelessHART and ISA100.11a using frequency hopping. For example, in FIG. 7, time zones and frequency bands (communication channels) of wireless communication according to ISA100.11a in the wireless nodes 51-52 are defined in the superframe. That is, frequency bands (communication channels) are allocated to divided time zones in such a manner that a communication channel Ch14 is allocated to a time zone t1-t2, a communication channel Ch12 is allocated to a time zone t2-t3, a communication channel Ch16 is allocated to a time zone t3-t4, . . . .

In this configuration, the management server generally has no mechanism of dynamically changing the frequency in wireless communication according to Wi-Fi. It is therefore necessary to allocate usable channels to the two wireless systems stationarily so that interference with the other wireless system can be avoided to avoid competition between frequency bands used in wireless communication according to Wi-Fi and wireless communication according to ISA100.11a/WirelessHART in a time zone to make channels allowed to be used in the two wireless systems coexistent.

For this reason, the management server 1 allocates usable channels to two wireless systems stationarily to avoid interference with the other wireless system and distributes communication setting information in which frequencies and timings of communication between wireless nodes are defined, to the respective wireless nodes 51-52 an 61-63.

Each wireless node performs communication based on a time schedule determined in a fixed communication channel set to avoid interference with the other wireless system based on communication setting information received from the management server 1.

As a result, when usable channels are allocated to two wireless systems stationarily in the aforementioned configuration, two or more wireless systems using different wireless communication standards can be made coexistent.

However, although frequency division communication of ISA100.11a aims at reducing a risk of wireless communication fault such as noise interference by distributive hopping of channels to be used, mixing of Wi-Fi communication reduces channels which can be used for frequency hopping as will be apparent from FIG. 7. Accordingly, there is a problem that the risk of deterioration of wireless communication quality due to noise interference increases.

Moreover, if a plurality of Wi-Fi networks coexist, the number of channels allowed to be used in ISA100.11a is limited to a very small number. Accordingly, there is a problem that the advantage of the communication mechanism of ISA100.11a intended for high reliability in field environment is spoiled greatly.

SUMMARY OF THE INVENTION

Exemplary embodiments of the present invention address the above disadvantages and other disadvantages not described above. However, the present invention is not required to overcome the disadvantages described above, and thus, an exemplary embodiment of the present invention may not overcome any disadvantages Accordingly, it is an illustrative aspect of the invention to provide improvement in communication reliability and prevention of lowering of throughput in a wireless network system which performs wireless communication according to a process control wireless communication standard and also performs wireless communication according to another wireless communication standard than the process control wireless communication standard.

According to one or more illustrative aspects of the invention, there is provided a relay device for relaying first wireless communication and second wireless communication. The first wireless communication is based on a process control wireless communication standard, and the second wireless communication is based on another wireless communication standard than the process control wireless communication standard. The device includes: a superframe management unit configured to receive a first superframe of the first wireless communication from the outside and generate a second superframe of the second wireless communication based on the first superframe; and a transmission unit configured to transmit the second superframe to a wireless communication terminal performing the second wireless communication.

According to one or more illustrative aspects of the invention, there is provided a wireless control network management system. The system includes: a plurality of first wireless communication terminals configured to perform a first wireless communication based on a process control wireless communication standard; a plurality of second wireless communication terminals configured to perform a second wireless communication based on another wireless communication standard than the process control wireless communication standard; a management server configured to manage process control wireless communication terminals connected to at least one field device through a wireline network; and a relay device configured to relay the first wireless communication and the second wireless communication. The device includes: a superframe management unit configured to receive a first superframe of the first wireless communication from the management server and generate a second superframe of the second wireless communication based on the first superframe; and a transmission unit configured to transmit the second superframe to at least one of the second wireless communication terminals.

Other aspects and advantages of the present invention will be apparent from the following description, the drawings and the claims.

DETAILED DESCRIPTION OF EXEMPLARY EMBODIMENTS

Hereinafter, exemplary embodiments of the present invention will be described with reference to the accompanying drawings.

Figure 1:
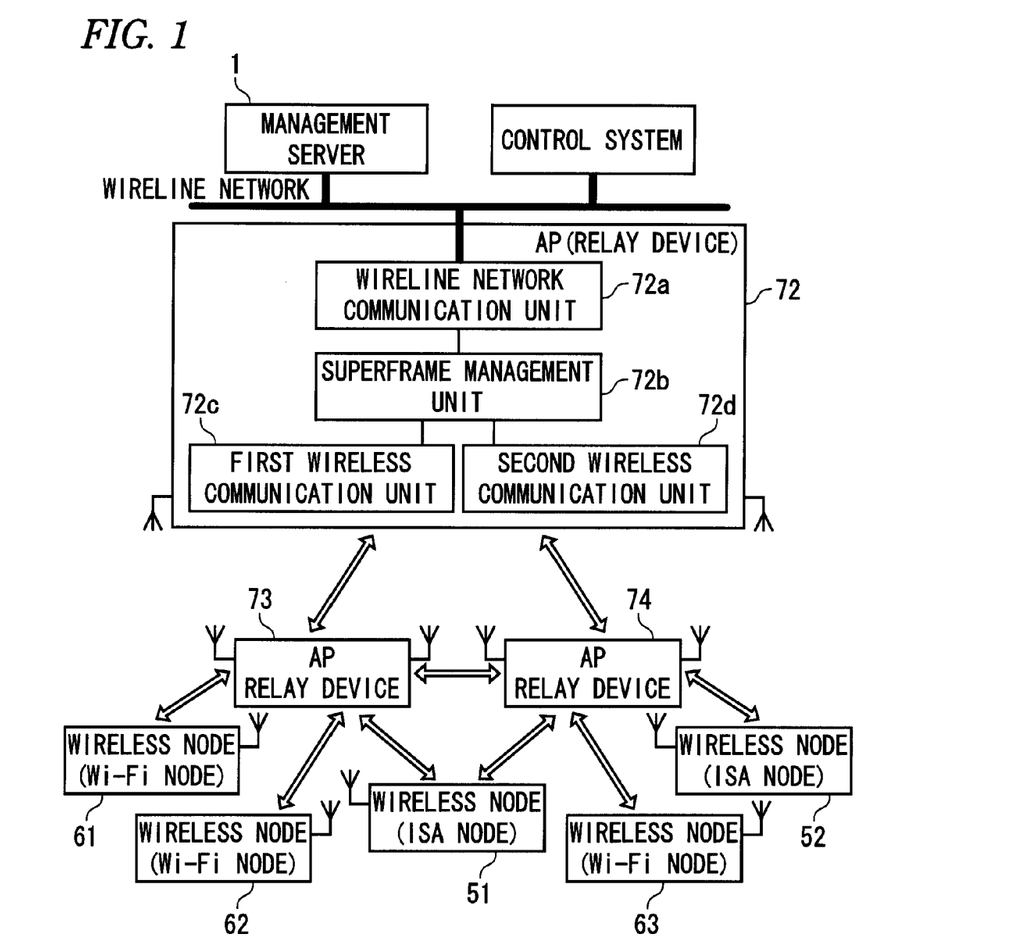
FIG. 1 is a configuration diagram showing a relay device and a wireless control network management system using the relay device according to an embodiment of the invention.

FIG. 1 is a configuration diagram showing a relay device and a wireless control network management system using the relay device according to an embodiment of the invention. Parts common with FIG. 5 are referred to by the same numerals and description thereof will be omitted suitably.

Points of difference of FIG. 1 from FIG. 5 are mainly in that the relay device includes a superframe management unit which receives a first wireless communication superframe indicating frequencies or frequency bands of wireless communication allocated based on a timing schedule and each timing of first wireless communication from the outside, generates a second wireless communication superframe based on the first wireless communication superframe, and a transmission unit which transmits the second wireless communication superframe to a wireless communication terminal performing second wireless communication, and in that the superframe management unit generates the second wireless communication superframe based on the first wireless communication superframe so that frequencies or frequency bands of wireless communication without interference with the first wireless communication are allocated in the second wireless communication superframe based on a timing schedule and respective timings of second wireless communication.

In FIG. 1, each of the relay device and the wireless control network management system using the relay device includes a management server 1, access points (hereinafter referred to as AP's) 72-74, wireless nodes 51-52 (represented by ISA nodes in FIG. 1), and wireless nodes 61-63 (represented by Wi-Fi nodes in FIG. 1). The management server 1 aggregates information of a wireless network from the wireless nodes 51-52 and collects and stores data from the wireless nodes 51-52 to thereby control the whole of a wireless system, for example, according to ISA100.11a (or WirelessHART) using frequency hopping. The AP's 72-74 are examples of relay devices which communicate with the respective wireless nodes 51-52 and 61-63 and relay wireless communication. For example, the wireless nodes 51-52 are field devices having sensor functions for measuring physical quantities such as temperature, flow rate, etc. or actuator functions for controlling control valves. The wireless nodes 51-52 are examples of first wireless communication terminals having wireless communication functions for wirelessly transmitting various kinds of measured data by wireless communication according to ISA100.11a (or WirelessHART) using frequency hopping. For example, the wireless nodes 61-63 are field devices such as maintenance terminals for field worker's maintenance work or surveillance cameras requiring communication with a great deal of data (e.g. statistical data and various kinds of image data such as motion image data and still image data). The wireless nodes 61-63 are examples of second wireless communication terminals having wireless communication functions for wirelessly transmitting various kinds of measured data by wireless communication according to Wi-Fi.

The management server 1 is connected to a control system which controls process control of the AP 72 and the wireless nodes 51-52 and 61-63 (field devices) through a wireline network. The management server 1 transmits a superframe to the AP 72 through the wireline network. The management server 1 further transmits the superframe to the AP's 73 and 74 via the AP 72 through a wireless line.

The control system is connected to the AP 72 through the wireline network. The control system transmits/receives measured data and control data for process control to/from the wireless nodes 51-52 (field devices).

The AP 72 is connected to the AP's 73 and 74 through the wireless line. The AP 72 mainly receives measured data and control data for process control from the wireless nodes 51-52 and 61-63 (field devices) through the AP's 73 and 74 and suitably transmits the measured data and the control data for process control to the control system. The AP 72 receives data for network join of wireless nodes and suitably transmits the data to the management server 1. The AP 72 further mainly transmits the superframe received from the management server 1 and the control data received from the control system to the AP's 73 and 74.

The AP 73 is connected to the wireless nodes 51, 61 and 62 through the wireless line. The AP 73 receives measured data, control data for process control and other data (e.g. data for network join of wireless nodes) from the wires nodes 51, 61 and 62 (field devices) and suitably transmits the data to the AP 72 and the wireless nodes 51, 61 and 62. The AP 73 transmits the superframe generated by the management server 1 and received from the AP 72, to the wireless nodes 51, 52 and 62. In other words, the AP 73 relays received data.

The AP 74 is connected to the wireless nodes 52 and 63 through the wireless line. The AP 74 receives measured data, control data for process control and other data (e.g. data for network join of wireless nodes) from the wires nodes 52 and 63 (field devices) and suitably transmits the data to the AP 72 and the wireless nodes 52 and 63. The AP 74 transmits the superframe generated by the management server 1 and received from the AP 72, to the wireless nodes 52 and 63. In other words, the AP 74 relays received data.

The wireless nodes 51 and 52 are field devices having sensor functions for measuring physical quantities such as temperature, flow rate, etc. or actuator functions for controlling control valves. The wireless nodes 51 and 52 transmit/receive various kinds of measured data, for example, according to ISA100.11a which is an example of process control wireless communication using frequency hopping based on a predetermined control process. The wireless nodes 51 and 52 perform wireless communication by using IEEE802.15.4 with a communication frequency band of 2.4 GHz.

In wireless communication according to ISA100.11a due to the wireless nodes 51-52, time division multiple access (TDMA) and frequency division multiple access (FDMA) are combined so that wireless communication is performed while the communication frequency and timing between wireless nodes are defined by the superframe.

The management server 1 manages wireless communication of the wireless nodes 51 and 52 which perform wireless communication according to the process control wireless communication standard (ISA100.11a). The management server 1 divides the time zone and the frequency band of wireless communication performed by the wireless nodes 51-52 and defines the timing of communication between wireless nodes and the frequency/frequency band in accordance with each communication timing. In this manner, the management server 1 generates a superframe and distributes the superframe to the wireless nodes 51-52.

Incidentally, the term "superframe" means a communication template in which the timing of communication between wireless nodes and the frequency/frequency band according to each communication timing are defined by dividing the time zone and the frequency band of wireless communication performed by the wireless nodes.

The management server 1 aggregates information (such as wireless communication quality, signal intensity, etc.) of the wireless network including the wireless nodes 51 and 52 performing wireless communication according to ISA100.11a and performs arithmetic operation based on the information to thereby determine the communication path of the wireless network, the hopping pattern of the frequency channel, the communication timing, etc.

The management server 1 serves also as a time server for synchronizing wireless communication timing in the wireless nodes 51 and 52 between nodes in the wireless network.

As a mechanism for time synchronization between the management server 1 and each device, there is used a mechanism in which error is corrected relatively based on time information stored in each communication frame as in an NTP (Network Time Protocol) or ISA100.11a. Incidentally, any method may be used as the method of time synchronization for each wireless node due to the management server.

Although the relay device and the wireless control network management system using the relay device according to the invention have been described in the case where the management server 1 is connected to the control system and the AP 72 as an example of the relay device through the wireline network, the management server 1 may be mounted in the same device as the access point.

The control system performs collection and monitoring of sensor data of the wireless nodes 51-52 and 61-63 and operation of actuators. Examples of the control system are instrumentation systems inclusive of DCS (Distributed Control Systems). Incidentally, any specific configuration may be used as the configuration of the control system as long as the control system can control the wireless nodes and can monitor process control and measured data in the wireless control network management system.

When wireless communication according to Wi-Fi wireless communication is performed and the communication frequency of IEEE802.11b/g is used, the wireless nodes 61-63 use the same 2.4 GHz band as that of ISA100.11a as a use frequency band.

The wireless nodes 61-63 perform wireless communication according to a communication template (e.g. frequency division, time division communication) defined by the superframe generated in the AP's 72-74 and received through the wireless line.

Figure 2A:
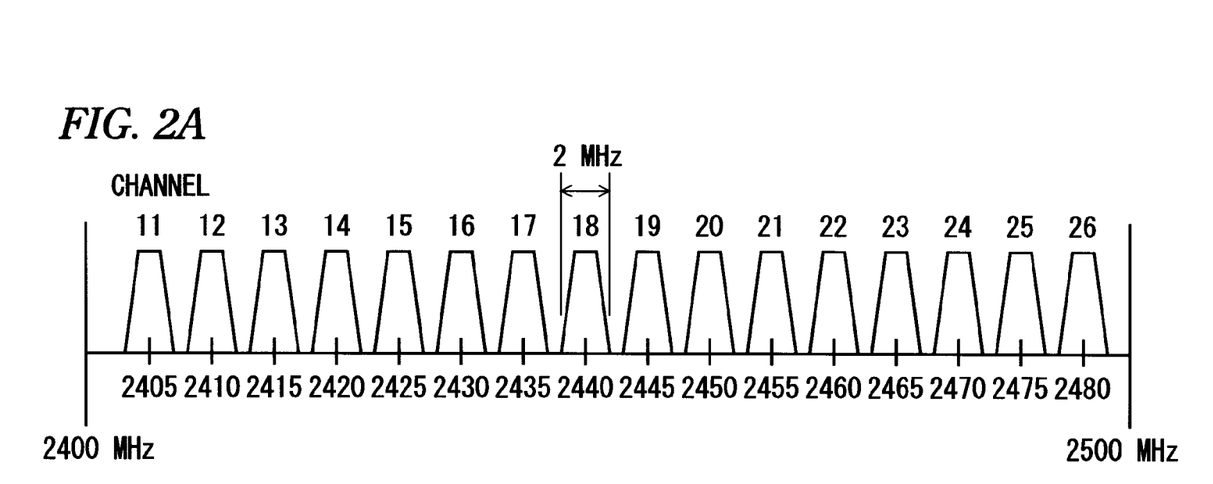
FIGS. 2A and 2B are explanatory views showing frequency bands used in wireless communication of wireless nodes 51-52 and 61-63 in FIG. 1.
Figure 2B:
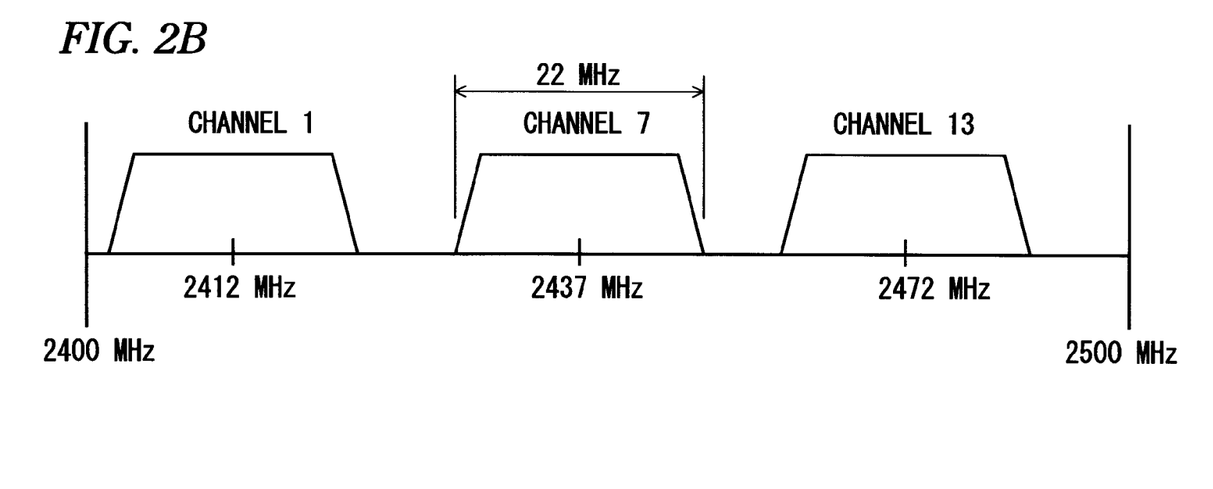

For this reason, the frequency band for wireless communication of the wireless nodes 51-52 and the frequency band for wireless communication of the wireless nodes 61-63 compete with each other because the same 2.4 GHz band is used. FIGS. 2A and 2B are explanatory views showing frequency bands used in wireless communication of the wireless nodes 51-52 and wireless communication of the wireless nodes 61-63 in FIG. 1, or in other words, frequency bands used in wireless communication according to ISA100.11a using frequency hopping. Because FIGS. 2A and 2B are the same as FIGS. 6A and 6B, description of FIGS. 2A and 2B will be omitted suitably.

In FIGS. 2A and 2B, the frequency band (communication channel) for wireless communication according to ISA100.11a in the wireless nodes 51-52 and the frequency band for wireless communication according to Wi-Fi in the wireless nodes 61-63 compete with each other because the same 2.4 GHz band is used.

Specifically, communication channels 11 to 26 of wireless communication according to ISA100.11a in the wireless nodes 51-52 cover 2 MHz-wide frequency bands with center frequencies of 2405 MHz, 2410 MHz, 2415 MHz, 2420 MHz, . . . , 2475 MHz, 2480 MHz whereas communication channels 1, 7 and 13 of wireless communication according to Wi-Fi in the wireless nodes 61-63 cover 22 MHz-wide frequency bands with center frequencies of 2412 MHz, 2437 MHz and 2472 MHz. Accordingly, the communication channels 11-14, 16-20 and 21-25 of wireless communication according to ISA100.11a in the wireless nodes 51 and 52 compete with communication channels 1, 7 and 13 in the wireless nodes 61-63.

The AP's 72-74 relay wireless communication by communicating with the wireless nodes 51-52 and 61-63, generate a second wireless communication superframe based on a first wireless communication superframe indicating the frequency or frequency band of wireless communication allocated according to a timing schedule and each timing of first wireless communication (wireless nodes 51-52) received from the outside, and transmit the second wireless communication superframe to the wireless nodes 61-63 performing second wireless communication. In other words, the relay devices such as the AP's 72-74 relay data among a wireless network of ISA100.11a wireless communication, a wireless network of Wi-Fi wireless communication and a backbone wireline network. Incidentally, the AP's 72-74 may be operated as routers which relay data only for wireless communications.

As shown in FIG. 1, the AP 72 includes a wireline network communication unit 72a, a superframe management unit 72b, a first wireless communication unit 72c, a second wireless communication unit 72d, a storage unit (not shown), and an arithmetic operation control unit (not shown). (Incidentally, the configuration of each of the AP's 73 and 74 is substantially the same as that of the AP 72 and description thereof will be omitted.)

Specifically, the wireline network communication unit 72a of the AP 72 transmits/receives measured data and control data for process control to/from the control system through the wireline network such as Ethernet (registered trademark), and transmits/receives a superframe or data used for joining each wireless node to a wireless network from the management server 1.

The superframe management unit 72b generates a second wireless communication superframe based on a first wireless communication superframe received from the management server 1 for the wireless nodes 51 and 52 performing first wireless communication (wireless communication according to a process control wireless communication standard (ISA100.11a)) under management of the management server 1. The superframe management unit 72b of the AP 72 generates the second wireless communication superframe based on the first wireless communication superframe so that a wireless communication frequency or frequency band which does not interfere with the first wireless communication frequency or frequency band at the timing schedule and each timing of the second wireless communication is allocated to the second wireless communication superframe.

Specifically, the superframe management unit 72b generates a superframe for Wi-Fi by selecting communication channels and communication timings without causing any interference while referring to the superframe for ISA100.11a.

The superframe management unit 72b performs time synchronization with wireless nodes performing Wi-Fi wireless communication, in order to maintain synchronization of the superframe. A mechanism in which error is corrected relatively based on time information stored in each communication frame as in NTP or ISA100.11a is used as a method of time synchronization. Incidentally, any method may be used for time synchronization of the superframe performed by the superframe management unit 72b.

The first wireless communication unit 72c performs wireless communication according to the first wireless communication standard (process control wireless communication standard (such as ISA100.11a)), and transmits/receives the measured data from the AP's 73 and 74 and the wireless nodes 51-52, the control data for process control, the superframe and data used for joining each wireless node to a wireless network, through the wireless line.

When wireless communication is performed according to the ISA100.11a wireless communication standard, the first wireless communication unit 72c includes a network protocol stack defined in ISA100.11a, and an IEEE802.15.4 wireless communication function.

The second wireless communication unit 72d performs second wireless communication such as Wi-Fi wireless communication (or wireless communication according to another wireless communication standard than the first wireless communication), and transmits/receives the measured data (e.g., large-size data such as image data) and the superframe from the AP's 73 and 74 and the wireless nodes 61-63, through the wireless line.

When wireless communication is performed according to the Wi-Fi wireless communication standard, the second wireless communication unit 72d includes a network protocol stack such as TCP/IP (Transmission Control Protocol/Internet Protocol), and a wireless communication function such as IEEE802.11a/b/g/n.

For example, the storage unit (not shown) is an ROM (Random Access Memory), an ROM (Read Only Memory) or the like. The storage unit mainly stores an OS (Operating System), programs and applications for operating the device 72 as an AP (relay device), data used during execution of these programs etc. and various kinds of information such route information indicating routing from the AP 72 to another AP, each wireless node, the management server 1 or the like.

For example, the arithmetic operation control unit (not shown) may be a CPU or the like. The arithmetic operation control unit includes an arithmetic operation control unit which is not shown but controls various kinds of functions and operations of respective parts.

Incidentally, the arithmetic operation control unit operates an OS or the like stored in the storage unit and reads and executes stored programs on the OS to thereby control respective devices or parts as a whole to make operations peculiar to the respective devices or parts. On this occasion, the storage unit may have a program storage area on which programs and applications to be executed by the arithmetic operation control unit are expanded, and a work area on which input data and data such as a processing result generated at the time of execution of the programs and applications are stored temporarily.

The superframe management unit 72b may be controlled by the arithmetic operation control unit when the arithmetic operation control unit operates an OS or the like stored in the storage unit and reads and executes stored programs and applications on the OS.

The aforementioned units may be constituted by devices which are independent of one another so that the devices are connected to one another by a bus.

Although the relay device according to the embodiment has been described on the assumption that the superframe management unit of the AP 72 receives the superframe of the process control wireless nodes 51 and 52 managed by the management server 1, the embodiment of the invention is not particularly limited thereto. For example, the superframe may be received through an exclusive connection line as long as the first wireless communication superframe indicating frequencies or frequency bands of wireless communication allocated based on a timing schedule and each timing of wireless communication of the process control wireless nodes 51 and 52 can be received. Reception of the superframe is not particularly limited to reception from the management server 1.

Figure 3:
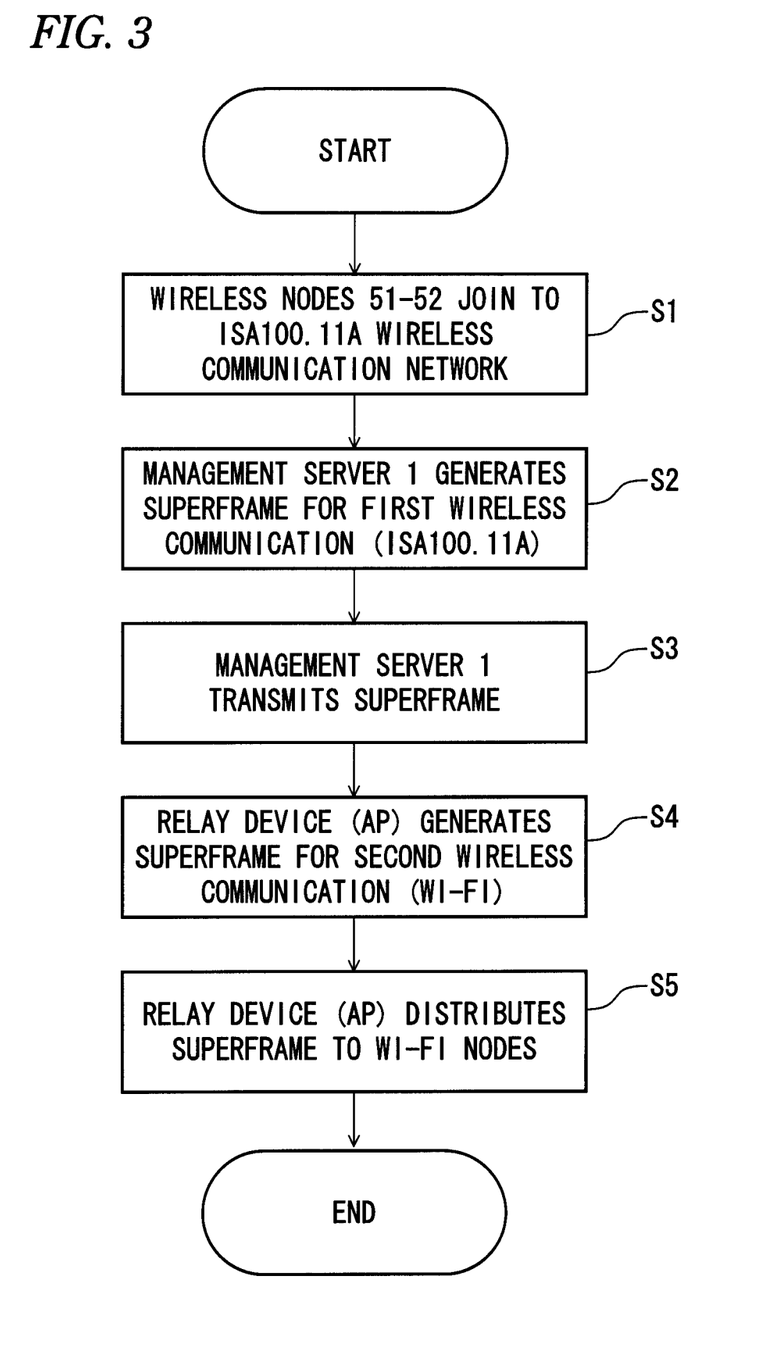
FIG. 3 is a flow chart for explaining operation of the relay device and the wireless control network management system using the relay device according to the embodiment of the invention.

FIG. 3 is a flow chart for explaining operation of the relay device and the wireless control network management system using the relay device according to the embodiment of the invention. The operation of the relay device and the wireless control network management system using the relay device will be described below in connection with operation steps S1 to S5 in FIG. 3. To simplify description, operation according to the embodiment will be described in the case where the AP 74 generates a superframe for Wi-Fi wireless communication.

<Step S1>

The wireless nodes 51-52 are joined to a wireless communication network for wireless communication according to ISA100.11a. On this occasion, the wireless nodes 51-52 are joined in such a manner that the wireless nodes 51-52 request the management server 1.

Specifically, the wireless nodes 51-52 transmit join data (join request data) to the management server 1 through the AP's 74 and 72 to request joining to a predetermined wireless communication network (or a multicast group in the network).

Here, the management server 1 centralizedly manages network information such as settings of the wireless nodes 51-52 and communication quality/intensity. At the time of joining of the wireless nodes 51-52 or at any timing after joining, the wireless nodes 51-52 notify the management server 1 of these pieces of information so that these pieces of information are stored in the management server 1.

<Step S2>

Upon reception of join data, the management server 1 determines an appropriate frequency hopping pattern, a communication route, communication timing, etc. by arithmetic operation based on the network information of the wireless node 51 or 52 (and/or other wireless nodes belonging to the network to which the wireless node requests to be joined), and generates a first wireless communication superframe.

Incidentally, the management server 1 may generate a superframe without waiting for completion of joining of all wireless nodes.

<Step S3>

The management server 1 transmits the generated superframe to the AP 72, and then transmits the superframe to the respective wireless nodes 51 and 52 via the AP's 72, 73 and 74.

Incidentally, the management server 1 may perform transmission of the superframe at the time of joining of the wireless node or at any timing.

The arithmetic operation control unit of each of the AP's 72, 73 and 74 controls the first wireless communication unit to transmit the ISA100.11a wireless communication superframe generated by the superframe management unit to other not-shown wireless nodes performing ISA100.11a wireless communication, through the wireless nodes 61-63 and the AP's 72, 73 and 74.

<Step S4>

Upon reception of the ISA100.11a (first wireless communication) superframe from the management server 1, the superframe management unit of the AP 74 generates a second wireless communication (Wi-Fi wireless communication) superframe so that the frequency channels and communication timings of the second wireless communication do not interfere with those of the first wireless communication defined in the received superframe.

Figure 4:
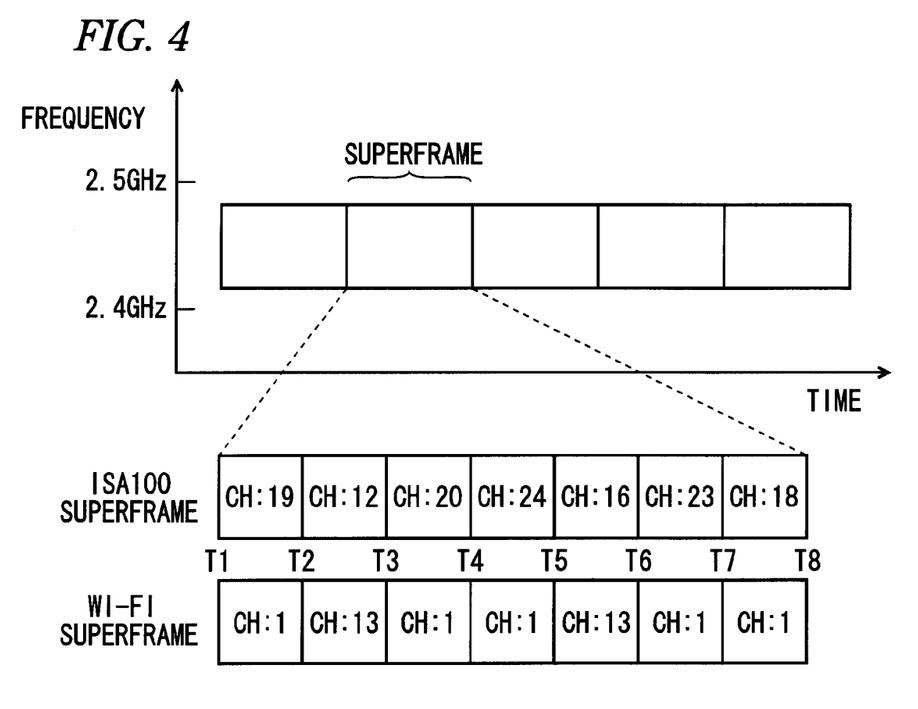
FIG. 4 is an explanatory view showing a first wireless communication superframe and a second wireless communication superframe.

FIG. 4 is an explanatory view showing the superframe of first wireless communication and the superframe of second wireless communication. In FIG. 4, time zones and frequency bands (communication channels) of ISA100.11a in the wireless nodes 51 and 52 are defined in the superframe of first wireless communication (ISA100.11a) received from the management server 1 by the AP 74. That is, frequency bands (communication channels) are allocated to divided time zones in such a manner that a communication channel Ch19 is allocated to a time zone t1-t2, a communication channel Ch12 is allocated to a time zone t2-t3, a communication channel Ch20 is allocated to a time zone t3-t4, a communication channel Ch24 is allocated to a time zone t4-t5, . . . .

The AP 74 further generates a superframe of second wireless communication (Wi-Fi wireless communication) based on the first wireless communication superframe so that the frequency channels and communication timings of the second wireless communication do not interfere with those of the first wireless communication as shown in FIG. 4.

Specifically, the AP 74 defines time zones and frequency bands (communication channels) of Wi-Fi wireless communication in the superframe of second wireless communication so that the frequency channels and communication timings of the second wireless communication do not interfere with those of the first wireless communication defined in the received superframe. That is, the AP 74 allocates frequency bands (communication channels) to divided time zones in such a manner that a communication channel Ch1 is allocated to a time zone t1-t2, a communication channel Ch13 is allocated to a time zone t2-t3, a communication channel Ch1 is allocated to a time zone t344, a communication channel Ch1 is allocated to a time zone t4-t5, . . . .

For example, because the communication channel used in the first wireless communication in the time zone t1-t2 is Ch19 and the communication channel used in the second wireless communication in the time zone t1-t2 is Ch1, the communication channels used in the time zone t1-t2 do not compete with each other.

<Step S5>

The arithmetic operation control unit of the AP 74 controls the second wireless communication unit to transmit the Wi-Fi wireless communication superframe generated by the superframe management unit to other not-shown wireless nodes performing Wi-Fi wireless communication, through the wireless nodes 61-63 and the AP's 72 and 73.

The wireless nodes 51-52 performing Wi-Fi wireless communication execute wireless communication based on the Wi-Fi wireless communication superframe which is received from the AP 74 and in which frequencies and timings of communication between wireless nodes are defined.

As a result, because the relay device and the wireless control network management system using the relay device according to the embodiment include a superframe management unit which receives a first wireless communication superframe indicating wireless communication frequencies or frequency bands allocated in accordance with a timing schedule and each timing of first wireless communication from the outside and generates a second wireless communication superframe based on the first wireless communication superframe, and a transmission unit which transmits the second wireless communication superframe to a wireless communication terminal performing second wireless communication, improvement of communication reliability and prevention of lowering of throughput can be attained in a wireless network system which performs wireless communication according to a process control wireless communication standard and also performs wireless communication according to another wireless communication standard than the process control wireless communication standard.

The following effects which are apt to be spoiled by the related-art method can be obtained in the embodiment of the invention when the aforementioned configuration is applied to a wireless control network management system in which ISA100.11a and Wi-Fi are mixed.

(A) Because the necessity of dividing communication time between wireless communication systems according to different wireless communication standards in the background art can be eliminated, the invention is effective in that communication can be made with the same throughput as in the case where each of an ISA100.11a wireless communication system and a Wi-Fi wireless communication system is operated singly.

(B) Because the necessity of dividing time can be eliminated, the invention is effective in that the capacity of communication per unit time in each wireless communication system increases so that the number of nodes accommodated in the wireless network can be increased.

(C) Because communication channels in a frequency band can be used widely both in ISA100.11a and in Wi-Fi, the invention is effective in that the capability of avoiding wireless noise is improved so that communication reliability can be enhanced.

Although the embodiment has been described in the case where the wireless control network management system aids operation concerned with process control of a plant or the like in industrial automation, the embodiment of the invention is not particularly limited thereto. For example, the wireless control network management system may aid operation of a control system of a water purification plant, an air-conditioning/illuminating system of a building, etc. in factory automation.

For example, in a building automation system, an illuminator, a switch, etc. may be provided as wireless nodes performing first wireless communication according to a wireless communication standard using frequency hopping while devices such as a surveillance camera may be provided as wireless nodes performing second wireless communication according to a wireless communication standard such as Wi-Fi to make it possible to transmit/receive a great deal of data, so that an AP as an example of the relay device generates a second wireless communication superframe based on the first wireless communication superframe according to the process control wireless communication standard and performs wireless communication based on the second wireless communication superframe.

As a result, with the aforementioned configuration, improvement in communication reliability and prevention of lowering of throughput can be attained in a wireless network system performing wireless communication according to the first and second wireless communication standards.

Thus, the relay device and the wireless control network management system using the relay device include: a superframe management unit which receives a first wireless communication superframe indicating frequencies or frequency bands of wireless communication allocated based on a timing schedule and each timing of first wireless communication from the outside, and generates a second wireless communication superframe based on the first wireless communication superframe; and a transmission unit which transmits the second wireless communication superframe to a wireless communication terminal performing second wireless communication. Accordingly, improvement in communication reliability and prevention of lowering of throughput can be attained in a wireless network system which performs wireless communication according to a process control wireless communication standard and also performs wireless communication according to another wireless communication standard than the process control wireless communication standard. Accordingly, improvement in communication reliability and prevention of lowering of throughput can be attained in a wireless network system which performs wireless communication according to a process control wireless communication standard and also performs wireless communication according to another wireless communication standard than the process control wireless communication standard. Accordingly, the embodiment of the invention can contribute to aiding appropriate operation of a wireless control network management system such as a control system of a water purification plant in plant and factory automation, an air-conditioning/illuminating system, etc.

While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A relay device for relaying first wireless communication and second wireless communication, wherein the first wireless communication is based on a process control wireless communication standard, and the second wireless communication is based on another wireless communication standard than the process control wireless communication standard, the device comprising:
a superframe management unit configured to receive a first superframe of the first wireless communication from the outside and generate a second superframe of the second wireless communication based on the first superframe; and
a transmission unit configured to transmit the second superframe to a wireless communication terminal performing the second wireless communication,
wherein the superframe management unit is configured to generate the second superframe based on the first superframe without causing any mutual interference between the first and second wireless communications.

2. The device according to claim 1, wherein the superframe management unit is configured to generate the second superframe based on the first superframe without causing any mutual interference between the first and second wireless communications by allocating a wireless communication frequency in the second superframe that is mutually exclusive with a wireless communication frequency in the first superframe within an overlapping time period.

3. The device according to claim 2, wherein
the superframe management unit is configured to receive the first superframe from a management server, the management server being configured to manage a wireless communication terminal for process control.

4. The device according to claim 1, wherein
one of the first and second wireless communications is based on ISA100.11a or WirelessHART and the other is based on Wireless Fidelity communication.

5. The device according to claim 1, further comprising:
a wireline network communication unit configured to receive the first superframe through a wireline network from a management server managing a wireless communication terminal for process control, and configured to send the first superframe to the superframe management unit.

6. A wireless control network management system, the system comprising;
a plurality of first wireless communication terminals configured to perform a first wireless communication based on a process control wireless communication standard;
a plurality of second wireless communication terminals configured to perform a second wireless communication based on another wireless communication standard than the process control wireless communication standard;
a management server configured to manage process control wireless communication terminals connected to at least one field device through a wireline network; and
a relay device configured to relay the first wireless communication and the second wireless communication, the device comprising:
a superframe management unit configured to receive a first superframe of the first wireless communication from the management server and generate a second superframe of the second wireless communication based on the first superframe; and
a transmission unit configured to transmit the second superframe to at least one of the second wireless communication terminals,
wherein the superframe management unit is configured to generate the second superframe based on the first superframe without causing any mutual interference between the first and second wireless communications.

7. The device according to claim 6, wherein the superframe management unit is configured to generate the second superframe based on the first superframe without causing any mutual interference between the first and second wireless communications by allocating a wireless communication frequency in the second superframe that is mutually exclusive with a wireless communication frequency in the first superframe within an overlapping time period.

8. The system according to claim 6, wherein
one of the first and second wireless communications is based on ISA100.11a or WirelessHART and the other is based on Wireless Fidelity communication.

9. The system of claim 6, wherein
the relay device further comprising:
a wireline network communication unit configured to receive the first superframe through the wireline network from the management server and configured to send the first superframe to the superframe management unit.

* * * * *